S. S. ROSE.
STEERING MECHANISM FOR TRACTION ENGINES.
APPLICATION FILED AUG. 17, 1906.

918,914.

Patented Apr. 20, 1909.
2 SHEETS—SHEET 1.

WITNESSES:
F. C. Fliedner
Agnes Pringle

INVENTOR
Samuel S. Rose
BY
Lincoln Sonntag
ATTORNEY

S. S. ROSE.
STEERING MECHANISM FOR TRACTION ENGINES.
APPLICATION FILED AUG. 17, 1906.

918,914.

Patented Apr. 20, 1909.
2 SHEETS—SHEET 2.

WITNESSES:
F. C. Fliedner
Chas. Sonntag

INVENTOR
Samuel S. Rose
BY
Lincoln Sonntag
ATTORNEY

UNITED STATES PATENT OFFICE.

SAMUEL S. ROSE, OF SANTA CLARA, CALIFORNIA, ASSIGNOR TO ROSE MANUFACTURING COMPANY, OF SAN JOSE, CALIFORNIA, A CORPORATION OF ARIZONA TERRITORY.

STEERING MECHANISM FOR TRACTION-ENGINES.

No. 918,914.        Specification of Letters Patent.        Patented April 20, 1909.

Application filed August 17, 1906. Serial No. 330,987.

*To all whom it may concern:*

Be it known that I, SAMUEL S. ROSE, a citizen of the United States, residing in the town of Santa Clara, county of Santa Clara, State of California, have invented new and useful Improvements in Steering Mechanisms for Traction-Engines, of which the following is a specification.

My invention relates to improvements in steering mechanisms for traction engines.

The object of my invention is to provide a steering mechanism for traction engines which may be operated under all conditions of ground or surface encountered in the running of such engine and which will greatly facilitate the steering thereof, and I declare that the following is such a description of my invention that anyone skilled in the art to which it pertains may make and use the same.

My invention consists in the novel arrangement and construction of parts described in the following specification, illustrated in the accompanying drawing and claimed in the appended claims.

Figure 1:
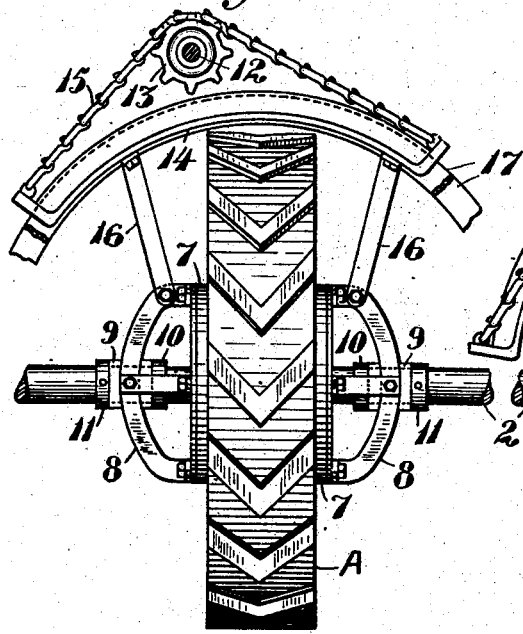
Figure 2:
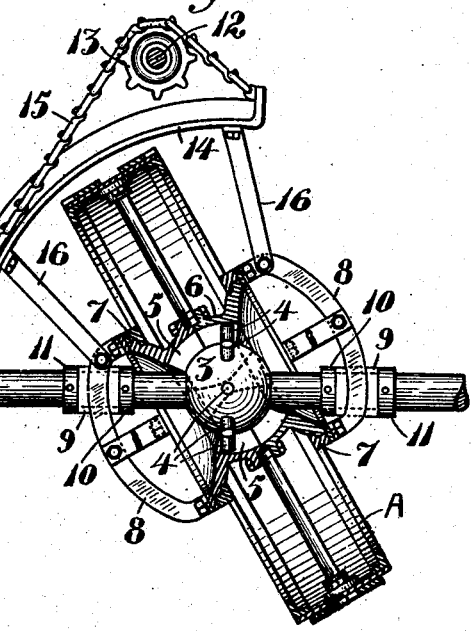
Figure 3:
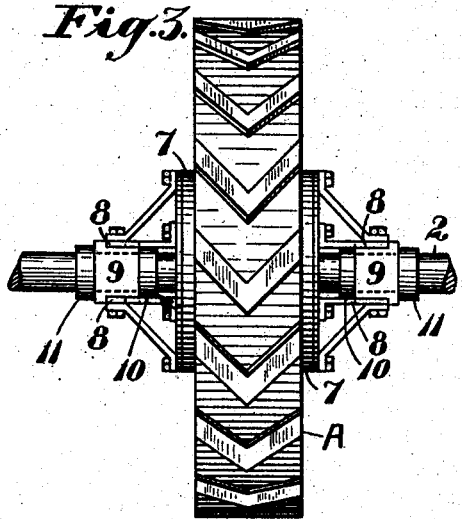
Figure 4:
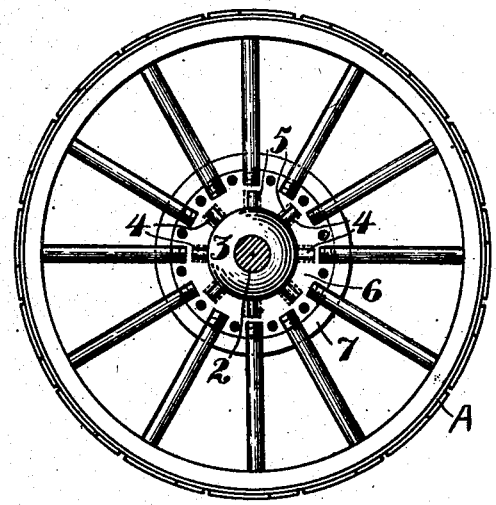
Figure 5:
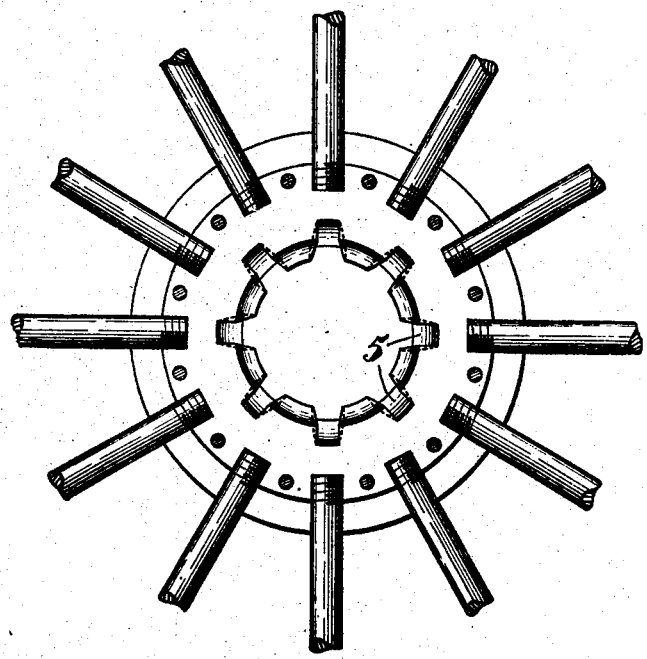
Figure 6:
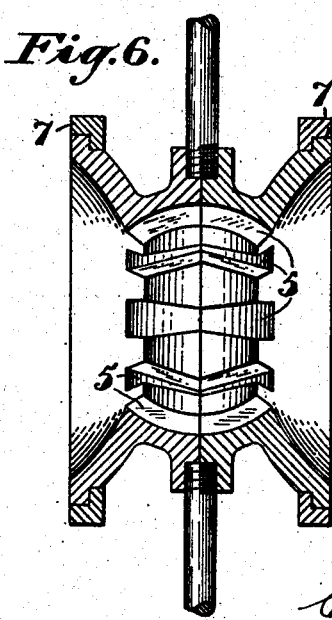

Referring to the accompanying drawing Figure 1 is a plan view of my front steering wheel for a traction engine. Fig. 2 is a sectional view of the same. Fig. 3 is a front view of the said wheel as shown in Fig. 1, excepting the part shown above the same in Fig. 1 and sustained by arms 16 which is omitted. Fig. 4 is a side view of the wheel A as shown in Fig. 3 with one half of the hub removed. Fig. 5 is a plan view of one of the half sections of the wheel hub, showing the spokes of the wheel broken away, Fig. 6 is a central vertical sectional view of the wheel hub.

In the drawings A represents a front steering wheel which is driven from a shaft or axle 2 by a spherical bearing 3 turning with said axle, the latter having pins 4 projecting from the same and slidable in grooves or channels 5 as shown in Fig. 2 and Fig. 4 formed in the hub 6 of the said steering wheel A and which hub is made in two parts, and is revoluble and supported within side bearings 7, the latter carrying segmental bands 8 which are slidable in bearings 9, said bearings being loosely mounted on shaft 2 between the collars 10 and 11. The hub 6 being formed of two equal circular parts, the said channels 5 are positioned equidistantly in each part, being of equal size, and the walls separating the said channels being likewise of equal size. In each of said circular parts the channels incline from the inner to the outer end of said part, and the cavity formed by connecting the parts being accommodated to the curved form of the bearing 3. By the widening of the channels an increased radius in turning is effected, such radius being approximately 76 degrees or 38 degrees on each side of the center.

The steering mechanism consists of shaft 12 which carries and turns a gear 13 and which gear operates a segmental band 14 by medium of a chain 15 secured at both ends of the segmental band 14. The said segmental band 14 has arms 16 projecting to and secured to the segmental bands 8 so that the wheel may be turned to any angle that may be required by the turning of gear 13 by shaft 12 in the running of the engine. The segmental band 14 is guided in any suitable frame such as shown at 17 which should be supported on the main frame of the engine. The preferable form of exterior for the traction wheel is as shown in Fig. 1. The side bearings have angular and longitudinal braces as shown in Fig. 3. The segmental band 14 has an arm at each end projecting at right angles to the same, and to said arm is secured one end of the chain 15. Any suitable device may be adopted for turning shaft 12.

It is to be understood that while I have illustrated and described the preferred embodiment of my invention I reserve the right to make all changes which properly fall within its spirit and scope.

Having thus described my invention what I claim as new and desire to secure by Letters Patent is.

1. In a steering mechanism for traction engines, the combination with a front axle, and a steering wheel mounted thereon to turn from side to side in a horizontal plane, of segmental straps connected to the hub of said wheel at both ends thereof, a pair of arms connected at one end to said segmental straps, a segmental band to which the other ends of said arms are connected, a steering shaft, a sprocket carried by said shaft, and a chain operating on said sprocket and having its ends connected to said segmental band, substantially as described.

2. In a steering mechanism for traction engines, the combination with an axle, a steering wheel mounted thereon to turn from side to side in a horizontal plane, and segmental straps secured to both ends of the hub of said wheel, of a segmental band having arms at its ends, a pair of arms connecting said segmental band with the segmental straps carried by the wheel hub, a steering shaft, a sprocket thereon, and a chain engaging said sprocket and having its ends connected to the arms of said segmental band.

3. In traction engines, a steering wheel, an axle on which said wheel is mounted to turn from side to side in a horizontal plane, the said wheel comprising a hub made in two equal parts having a central cavity provided with channels widening angularly from the center of the hub cavity to the outer end of each of the hub parts, a spherical bearing carried by the axle and operating in said cavity, pins carried by the bearing to engage in said channels, side bearings in which said hub parts revolve, segmental straps secured to said side bearings, and an actuating mechanism connected to said straps for turning the wheel.

In testimony whereof I affix my signature in presence of two witnesses.

SAMUEL S. ROSE.

Witnesses:
W. A. JOHNSTON,
VINA LISLE.